(12) United States Patent  
Kandala (10) Patent No.: US 7,304,973 B2
(45) Date of Patent: Dec. 4, 2007

(54) IEEE 802.11 BURST ACKNOWLEDGEMENT INTERFACE

(75) Inventor: Srinivas Kandala, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1059 days.

(21) Appl. No.: 10/610,172

(22) Filed: Jun. 30, 2003

(65) Prior Publication Data

US 2004/0008690 A1   Jan. 15, 2004

Related U.S. Application Data

(60) Provisional application No. 60/393,590, filed on Jul. 2, 2002.

(51) Int. Cl.
*H04Q 7/24* (2006.01)
*H04J 3/16* (2006.01)
(52) U.S. Cl. ............... 370/338; 370/395.54; 370/445; 370/471; 714/749
(58) Field of Classification Search ........... 370/310, 370/335, 338, 348, 389, 395.21, 395.5, 445, 370/448, 468, 471, 474; 709/225; 455/69; 714/738, 746, 749
See application file for complete search history.

(56) References Cited

U.S. PATENT DOCUMENTS 6,496,481 B1   12/2002   Wu et al. .............. 370/242

6,505,034 B1   1/2003   Wellig .................. 455/69

FOREIGN PATENT DOCUMENTS

EP   0653865   5/1995

*Primary Examiner*—Afsar Qureshi
(74) *Attorney, Agent, or Firm*—Law Office of Gerald Maliszewski; Gerald Maliszewski (57) ABSTRACT

A system and method are provided for defining a Burst ACK interface in an IEEE 802.11 network. The method comprising: using Burst ACK primitives to negotiate between peer station management entities (SMEs); establishing an interface between peer MAC entities associated with the SMEs; and, in response to negotiating with the Burst ACK primitives, using a Burst ACK protocol to communicate information between peer Quality of Service (QoS) stations (QSTAs) associated with the SMEs. Using a Burst ACK protocol to communicate information between peer QSTAs includes communicating between the peer MAC entities. In some aspects, establishing an interface between peer MAC entities includes each MAC entity: transceiving Burst ACK primitives with an associated SME; converting between Burst ACK primitives and physical layer communication MAC frames; and, transceiving communication physical layer MAC frames with a peer MAC entity, via the physical layer communication MAC frames.

29 Claims, 9 Drawing Sheets

| NAME | TYPE | VALID RANGE | DESCRIPTION |
|---|---|---|---|
| PeerQSTAAddress | MAC Address | N/A | Specifies the address of the peer MAC entity with which to perform the Burst ACK Initiation (or modification) |
| Dialog Token | Integer | 0-255 | Specifies a number unique to the QoS management action primitives and frames used in defining or deleting a Burst ACK |
| TID | Integer | 0-15 | Specifies the TID of the data |
| Transmit Buffer Size | Integer | 0-128 | Specifies the number of MSDUs that can be held in its buffer |

Fig. 6

| NAME | TYPE | VALID RANGE | DESCRIPTION |
|---|---|---|---|
| PeerQSTAAddress | MAC Address | N/A | Specifies the address of the peer MAC entity with which to perform the Burst ACK deletion |
| Dialog Token | Integer | 0-255 | Specifies a number unique to the QoS management action primitives and frames used in defining or deleting a Burst ACK |
| Direction | Enumeration | Originator, recipient | Specifies if the MAC entity is the originator or the recipient of the data stream that uses the Burst ACK |
| TID | Integer | 0-15 | Specifies the TID of the data |

Fig. 3

| NAME | TYPE | VALID RANGE | DESCRIPTION |
|---|---|---|---|
| PeerQSTAAddress | MAC Address | N/A | Specifies the address of the peer MAC entity with which the Burst ACK initiation (or modification) was attempted. This value must match the PeerQSTAAddress parameter specified in MLME-DEFBA.request |
| Dialog Token | Integer | 0-255 | Specifies a number unique to the QoS management action primitives and frames used in defining or deleting a Burst ACK. This value must match the Dialog Token parameter specified in MLME-DEFBA.request |
| TID | Integer | 0-15 | Specifies the TID of the data. This value must match the TID specified in MLME-DEFBA.request |
| ResultCode | Enumeration | SUCCESS, REFUSED, TIMEOUT | Indicates the result of the corresponding MLME-DEFBA.request |
| Burst ACK Policy | Enumeration | Immediate, Delayed | Specifies the Burst ACK Policy |
| Re-ordering Buffer Size | Integer | 0-128 | Specifies the number of MSDUs that can be burst for the specified TID |

Fig. 4

| NAME | TYPE | VALID RANGE | DESCRIPTION |
|---|---|---|---|
| PeerQSTAAddress | MAC Address | N/A | Specifies the address of the peer MAC entity with which to perform the Burst ACK Initiation (or modification) |
| Dialog Token | Integer | 0-255 | Specifies a number unique to the QoS management action primitives and frames used in defining or deleting a Burst ACK |
| Dialog Token | Integer | 0-255 | Specifies a number unique to the QoS management action primitives and frames used in defining or deleting a Burst ACK |
| TID | Integer | 0-15 | Specifies the TID of the data |
| Transmit Buffer Size | Integer | 0-128 | Specifies the number of MSDUs that can be held in its buffer |

Fig. 5

| NAME | TYPE | VALID RANGE | DESCRIPTION |
|---|---|---|---|
| PeerQSTAAddress | MAC Address | N/A | Specifies the address of the peer MAC entity which attempted the Burst ACK initiation (or modification). This value must match the PeerQSTAAddress parameter specified in MLME-DEFBA.indication |
| Dialog Token | Integer | 0-255 | Specifies a number unique to the QoS management action primitives and frames used in defining or deleting a Burst ACK. This value must match the Dialog Token parameter specified in MLME-DEFBA.incication |
| TID | Integer | 0-15 | Specifies the TID of the data. This value must match the TID specified in MLME-DEFBA.indication |
| ResultCode | Enumeration | SUCCESS, REFUSED, INVALID PARAMETERS, TIMEOUT | Indicates the result of the corresponding MLME-DEFBA.indication |
| ResultCode | Enumeration | SUCCESS, REFUSED, INVALID PARAMETERS, TIMEOUT | Indicates the result of the corresponding MLME-DEFBA.indication |
| Burst ACK Policy | Enumeration | Immediate, Delayed | Specifies the Burst ACK Policy. Undefined when ResultCode is REFUSED |
| Re-ordering Buffer Size | Integer | 0-128 | Specifies the number of MSDUs that can be burst for the specified TID. Undefined when ResultCode is REFUSED |

Fig. 7

| NAME | TYPE | VALID RANGE | DESCRIPTION |
|---|---|---|---|
| PeerQSTAAddress | MAC Address | N/A | Specifies the address of the peer MAC entity with which the Burst ACK initiation (or modification) was attempted. This value must match the PeerQSTAAddress parameter specified in MLME-DELBA.request |
| Dialog Token | Integer | 0-255 | Specifies a number unique to the QoS management action primitives and frames used in defining or deleting a Burst ACK. This value must match the Dialog Token parameter specified in MLME-DELBA.request |
| Direction | Enumeration | Originator, recipient | Specifies if the MAC entity is the originator or the recipient of the data stream that uses the Burst ACK |
| TID | Integer | 0-15 | Specifies the TID of the data. This value must match the TID specified in MLME-DELBA.request |
| ResultCode | Enumeration | SUCCESS, INVALID-PARAMETERS, FAILURE | Indicates the result of the corresponding MLME-DELBA.request |

Fig. 8

| NAME | TYPE | VALID RANGE | DESCRIPTION |
|---|---|---|---|
| PeerQSTAAddress | MAC Address | N/A | Specifies the address of the peer MAC entity with which to perform the Burst ACK deletion |
| Dialog Token | Integer | 0-255 | Specifies a number unique to the QoS management action primitives and frames used in defining or deleting a Burst ACK |
| Direction | Enumeration | Originator, Recipient | Specifies if the MAC entity is the originator or the recipient of that data stream that uses the Burst ACK |
| TID | Integer | 0-15 | Specifies the TID of the data |

IEEE 802.11 BURST ACKNOWLEDGEMENT INTERFACE

RELATED APPLICATIONS

This application claims the benefit of a provisional application entitled, METHOD TO SET UP BURST ACK IN A IEEE 802.11 WIRELESS LAN BY THE STATION, invented by Srinivas Kandala, Ser. No. 60/393,590, filed Jul. 2, 2002.

BACKGROUND OF THE INVENTION

1. Field of the Invention

This invention generally relates to IEEE 802.11 communications and, more particularly to a system and method for establishing a Burst Acknowledgement protocol between selected 802.11 peer stations.

2. Description of the Related Art

As noted in "A Short Tutorial on Wireless LANs and IEEE 802.11 by Lough, Blankenship and Krizman (computer.org/students/looking/summer97/ieee802), the IEEE 802.11 standard places specifications on the parameters of both the physical (PHY) and medium access control (MAC) layers of the network. The PHY layer, which actually handles the transmission of data between nodes, can use either direct sequence spread spectrum, frequency-hopping spread spectrum, or infrared (IR) pulse position nodulation. IEEE 802.11 makes provisions for data rates from 1 Mbps to 54 Mbps, and calls for operation in the 2.4-2.4835 GHz frequency band (in the case of spread-spectrum transmission), which is an unlicensed band for industrial, scientific, and medical (ISM) applications. IEEE 802.11 also makes provision for data rates from 6 Mbps to 54 Mbps, and calls for operation in the 5.2 and 5.8 U-NII (Unlicensed Information Infrastructure) band.

The MAC layer is a set of protocols that is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor" which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Since the probability that two nodes will choose the same backoff factor is small, collisions between packets are minimized. Collision detection, as is employed in Ethernet, cannot be used for the radio frequency transmissions of IEEE 802.11. The reason for this is that when a node is transmitting it cannot hear any other node in the system which may be transmitting, since its own signal will drown out any others arriving at the node.

Whenever a packet is to be transmitted, the transmitting node first sends out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is necessary to avoid the "hidden node" problem. In the hidden-node situation node A can communicate with node B, and node B can communicate with node C, however, node A cannot communicate node C. Thus, for instance, although node A may sense the channel to be clear, node C may in fact be transmitting to node B. The protocol described above alerts node A that node B is busy, and hence it must wait before transmitting its packet.

The above-mentioned "Stop and Wait" protocol, that uses of an ACK packet to minimize the "hidden node" problem, comes with a corresponding expense. For example, if a communication is not received, the transmitter will not repeat the communication until it receives a request. This request is an overhead cost that degrades the channel traffic bandwidth. That is, the throughput is too low. Further, protocol may be unable to support higher quality of service (higher bandwidth) communications in some scenarios.

Burst, or Block Acknowledgement is a mechanism defined by IEEE 802.11 Tge which allows for a form of selective-retransmission between wireless LANs which conventionally use the "Stop and Wait" protocol. While there is a mechanism to set up Burst ACK between two peers, the mechanism does not have a defined interface. There is no means established for an application to set up the Burst ACK mechanism with a peer. Further, even if the mechanism could be established, there is no means for establishing the mechanism for a selected class of service.

It would be advantageous if IEEE 802.11 communications could be enabled to selectively engage a Burst Acknowledgment protocol, to minimize system overhead.

SUMMARY OF THE INVENTION

The invention defines an interface for setting up a Burst ACK mechanism between peers, and describes how such an interface can be used at an IEEE 802.11 station. The need for such a mechanism arises because a station cannot necessarily use the Burst ACK mechanism for all data packets in its queues. The mechanism must be initialized by higher-layers, or perhaps, even an application. The primitives used to establish the Burst ACK mechanism are called Burst ACK primitives. The primitives include MLME-DEFBA.xxx and MLME-DELBA.xxx primitives, where xxx denotes request, confirm, indication, or response.

Accordingly, a method is provided for defining a Burst ACK interface in an IEEE 802.11 network. The method comprising: using Burst ACK primitives to negotiate between peer station management entities (SMEs); establishing an interface between peer MAC entities associated with the SMEs; and, in response to negotiating with the Burst ACK primitives, using a Burst ACK protocol to communicate information between peer Quality of Service (QoS) stations (QSTAs) associated with the SMEs. More specifically, using a Burst ACK protocol to communicate information between peer Quality of Service (QoS) stations (QSTAs) includes using Burst ACK protocol to communicate between the peer MAC entities.

In some aspects of the method, establishing an interface between peer MAC entities includes each MAC entity: transceiving Burst ACK primitives with an associated SME; converting between Burst ACK primitives and physical layer communication MAC frames; and, transceiving communication physical layer MAC frames with a peer MAC entity, via the physical layer communication MAC frames.

In some aspects, a first SME issues a MLME-DEXBA.request primitive to an associated first MAC entity and the first MAC entity converts the MLME-DEXBA.request primitive into a Burst ACK request frame. The letter "X" in the primitive is a variable—a "F" in primitives that establish or modify a Burst ACK interface, or an "L" in primitives that tear down a Burst ACK interface. The first MAC transmits the Burst ACK request frame to a second QSTA. A second MAC entity associated with the second QSTA converts the Burst ACK request frame into a MLME-DEXBA.indication primitive and sends the MLME-DEXBA.indication primitive to an associated second SME.

The second SME issues a MLME-DEXBA.response primitive to the second MAC entity, which converts the MLME-DEXBA.response primitive into a Burst ACK response frame and transmits the Burst ACK response frame to the first QSTA. The first MAC entity converts the Burst ACK response frame into a MLME-DEXBA.confirm primitive and sends the MLME-DEXBA.confirm primitive to the first SME. Note, that there is no MLME-DELBA.response primitive and no response frame needed to tear down the Burst ACK mechanism.

Additional details of the above-described method and an IEEE 802.11 Burst ACK interface system are described below.

DETAILED DESCRIPTION OF THE PREFERRED EMBODIMENTS

Figure 1:
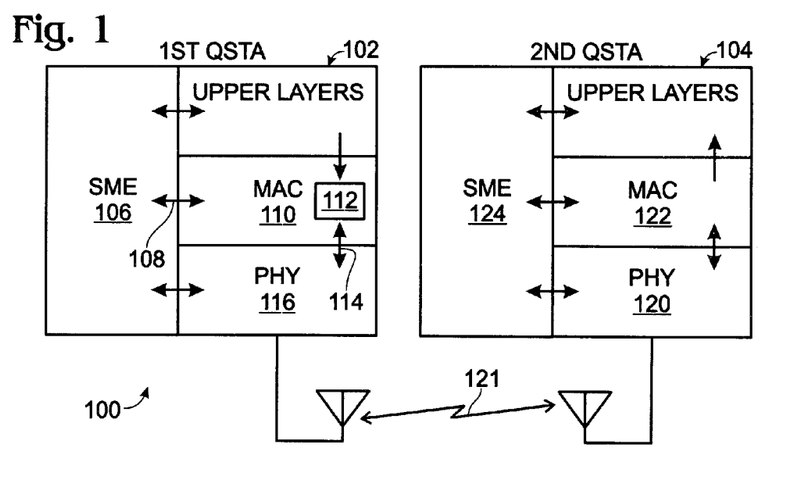
FIG. 1 is a schematic block diagram of the present invention IEEE 802.11 network Burst Acknowledgement (ACK) interface system.

FIG. 1 is a schematic block diagram of the present invention IEEE 802.11 network Burst Acknowledgement (ACK) interface system. The system 100 comprises a pair of peer Quality of Service (QoS) stations (QSTAs) 102 and 104. Although only two QSTAs are shown for simplicity, the invention is not limited to any particular number of QSTAs. Using the first QSTA 102 as an example, each QSTA includes a station management entity (SME) 106 having a MAC interface on line 108 for transceiving Burst ACK primitives. A MAC entity 110 has an SME interface on line 108 to transceive primitives, a processor 112 to convert between primitives and MAC frames, and a physical layer interface on line 114 to transceive primitive-converted MAC frames. A physical layer (PHY) entity 116 has a MAC interface on line 114 to transceive MAC frames and a physical layer interface on line 118 connected to a peer QSTA PHY entity 120 to transceive physical layer communications. The peer QSTA PHY entity 120 is associated with the second QSTA 104 in this example. Typically, the PHY entities 116/120 communicate via a wireless link represented by reference designator 121

As a result, peer QSTA MAC entities 110 and 122 use a Burst ACK protocol to communicate information, in response to peer QSTA SMEs 106 and 124 negotiating with the Burst ACK primitives. Alternately stated, the SMEs 106/124 negotiate with Burst ACK primitives via their corresponding MAC entities 110/122.

In some aspects of the system 100, the first QSTA MAC entity 110 transmits an initial message, via the first QSTA PHY entity 116, to a second QSTA MAC entity 122 (via second QSTA PHY entity 120). The first QSTA MAC entity 110 selectively retransmits the initial message to the second QSTA MAC entity 122 in response to failing to receive an initial message acknowledgement from the second QSTA MAC entity 122. Alternately stated, a Burst ACK protocol is used in communications from the first QSTA MAC entity 110 to the second QSTA MAC entity 122. The Burst ACK protocol is well understood in the art and is explained in IEEE 802.11 Tge draft 4.0, Section 9.11, which is incorporated herein by reference.

The general process of using the Burst ACK primitives is described below. The first QSTA SME 106 issues a MLME-DEXBA.request primitive to the first QSTA MAC entity 110. Note that the "X" in the primitive can be either an "L" or an "F", depending on the action required, as is explained in detail below. The first QSTA SME 106 transceives Burst ACK primitives to perform an action such as initializing Burst ACK parameters or modifying established Burst ACK parameters. Then, MLME-DEFBA primitives are used. The first QSTA SME 106 also uses primitives for tearing down established Burst ACK parameters. Then, MLME-DELBA primitives are used.

The first QSTA MAC entity 110 converts the MLME-DEXBA.request primitive into a Burst ACK request frame and the first QSTA PHY entity 116 transmits the Burst ACK request frame to a second QSTA PHY entity 120. The second QSTA MAC entity 122 converts the Burst ACK request frame received by the second QSTA PHY entity 120 into a MLME-DEXBA.indication primitive and sends the MLME-DEXBA.indication primitive to a second QSTA SME 124.

In some aspects, the second QSTA SME 124, or an application associated with the SME 124 (not shown) makes a decision in response to the received primitive and issues a MLME-DEXBA.response primitive to the second QSTA MAC entity 122. The second QSTA MAC entity 122 converts the MLME-DEXBA.response primitive into a Burst ACK response frame and the second QSTA PHY entity 120 transmits the Burst ACK response frame to the first QSTA PHY entity 116. The first QSTA MAC entity 110 converts the Burst ACK response frame into a MLME-DEXBA.confirm primitive and sends the MLME-DEXBA.confirm primitive to the first QSTA SME 106. As noted above, a response primitive is not required to tear down a Burst ACK protocol between stations.

The first QSTA SME 106 issues a MLME-DEFBA.request primitive with fields selected from the group including the second MAC entity address, a Dialog Token to define QoS management action primitives and frames used in defining and deleting a Burst ACK. Alternately stated, a unique number is specified for the QoS management action primitives used in defining or deleting a Burst ACK. Other fields include a traffic identifier (TID), to specify the TID of the data, and a transmit buffer size definition. Typically, the buffer size is defined by a number of MAC service data units (MSDUs). The second QSTA MAC entity 122 sends the MLME-DEFBA.indication primitive to the second QSTA SME 124 with fields selected from the group including the first MAC entity address, a Dialog Token to define QoS management action primitives and frames used in defining or deleting a Burst ACK, a TID, and a transmit buffer size definition (the number of MSDUs that can be held in its buffer).

The second QSTA SME 124 issues a MLME-DEFBA.response primitive with fields selected from the group including the first MAC entity address. This address matches the address in the MLME-DEFBA.indication primitive. Other fields include a Dialog Token matching the Dialog Token received in the MLME-DEFBA.indication primitive, a TID matching the TID received in the MLME-DEFBA.indication primitive, and a ResultCode to indicate the response to the received MLME-DEFBA.indication primitive. The ResultCode indicates whether the request made by the first QSTA SME 106 has been accepted, refused, or if the request includes invalid parameters, and the timeout. Other fields may include Burst ACK Policy to specify a policy selected from the group including immediate and delayed (if Burst ACK is accepted), and a Re-ordering Buffer Size to specify the TID burst size. Typically the TID burst size is the number of MSDUs that can be burst for the specified TID (if Burst ACK is accepted).

The first QSTA MAC entity 110 sends a MLME-DEFBA.confirm primitive to the first QSTA SME with fields selected from the group including the second MAC entity address, a Dialog Token matching the Dialog Token issued in the MLME-DEFBA.request primitive, a TID matching the TID received in the MLME-DEFBA.request primitive, a ResultCode to indicate the response to the received MLME-DEFBA.request primitive, a Burst ACK Policy to specify a policy selected from the group including immediate and delayed, and a Re-ordering Buffer Size to define the TID burst size.

In a similar manner, the first QSTA SME 106 issues a MLME-DELBA.request primitive with fields selected from the group including the second MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID to specify the TID of the data.

The second QSTA MAC entity 122 sends a MLME-DELBA.indication primitive with fields selected from the group including the second MAC entity address, a Dialog Token to define QoS management action primitives and frames used in defining and deleting a Burst ACK. As with the DEFBA primitive, a unique number is specified for the QoS management action primitives used in defining or deleting a Burst ACK. A Direction selects the MAC entity named in the MAC address field from a group including the originator and the recipient of the data stream that uses the Burst ACK. A TID specifies the TID of the data.

In response to an acknowledgement from the second QSTA MAC entity, the first QSTA MAC entity 110 sends a MLME-DELBA.confirm primitive with fields selected from the group including the second MAC entity address, a Dialog Token matching the Dialog Token of the MLME-DELBA.request, a Direction selecting the MAC entity named in the MAC address field from a group including the originator and the recipient of the data stream that uses the Burst ACK, a TID matching the value specified in the MLME-DELBA.request, and a ResultCode indicating the result of the corresponding MLME-DELBA.request.

FUNCTIONAL DESCRIPTION

The primitives used for the present invention Burst ACK mechanism are called Burst ACK primitives, and include MLME-DEFBA.xxx and MLME-DELBA.xxx primitives, where xxx denotes request, confirm, indication, or response. They each contain, starting from the Dialog Token field of the corresponding QoS Management Action frame, Define Burst ACK QoS Action request and response frames and Delete Burst ACK QoS Action request frames as their parameters.

MLME-DEFBA.request

Figure 2:
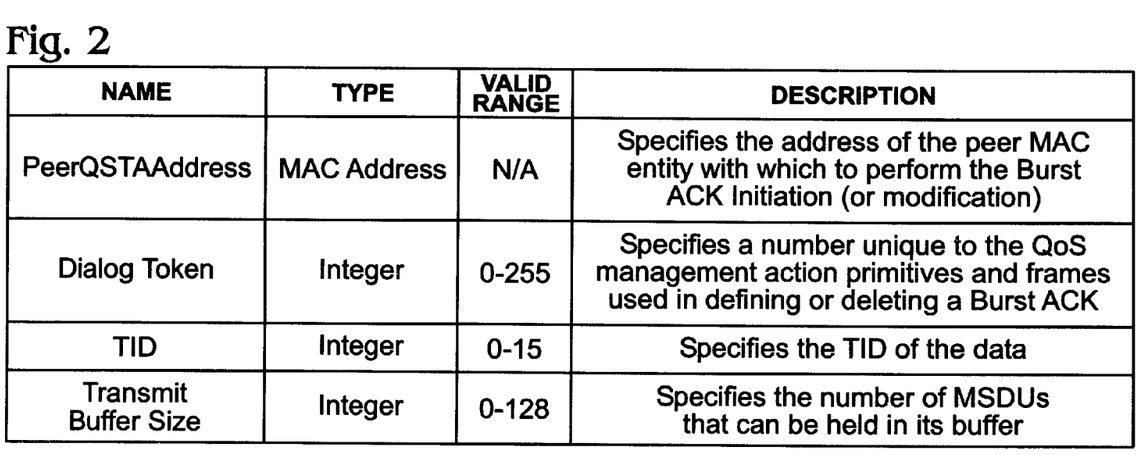
FIG. 2 is a table listing MLME-DEFBA.request fields.

FIG. 2 is a table listing MLME-DEFBA.request fields. This primitive requests the initiation (or modification) of Burst ACK with a peer MAC entity. The primitive parameters are as follows:

| MLME-DEFBA.request | ( PeerQSTAAddress, Dialog token, TID, Transmit Buffer Size ) |
|---|---|

This primitive is generated by the SME at a QSTA to request initiation (or modification) of Burst ACK with the specified peer MAC entity. Upon receipt, the QSTA sends the Define Burst ACK request QoS Action frame to the specified peer MAC entity.

MLME-DEFBA.confirm

Figure 3:
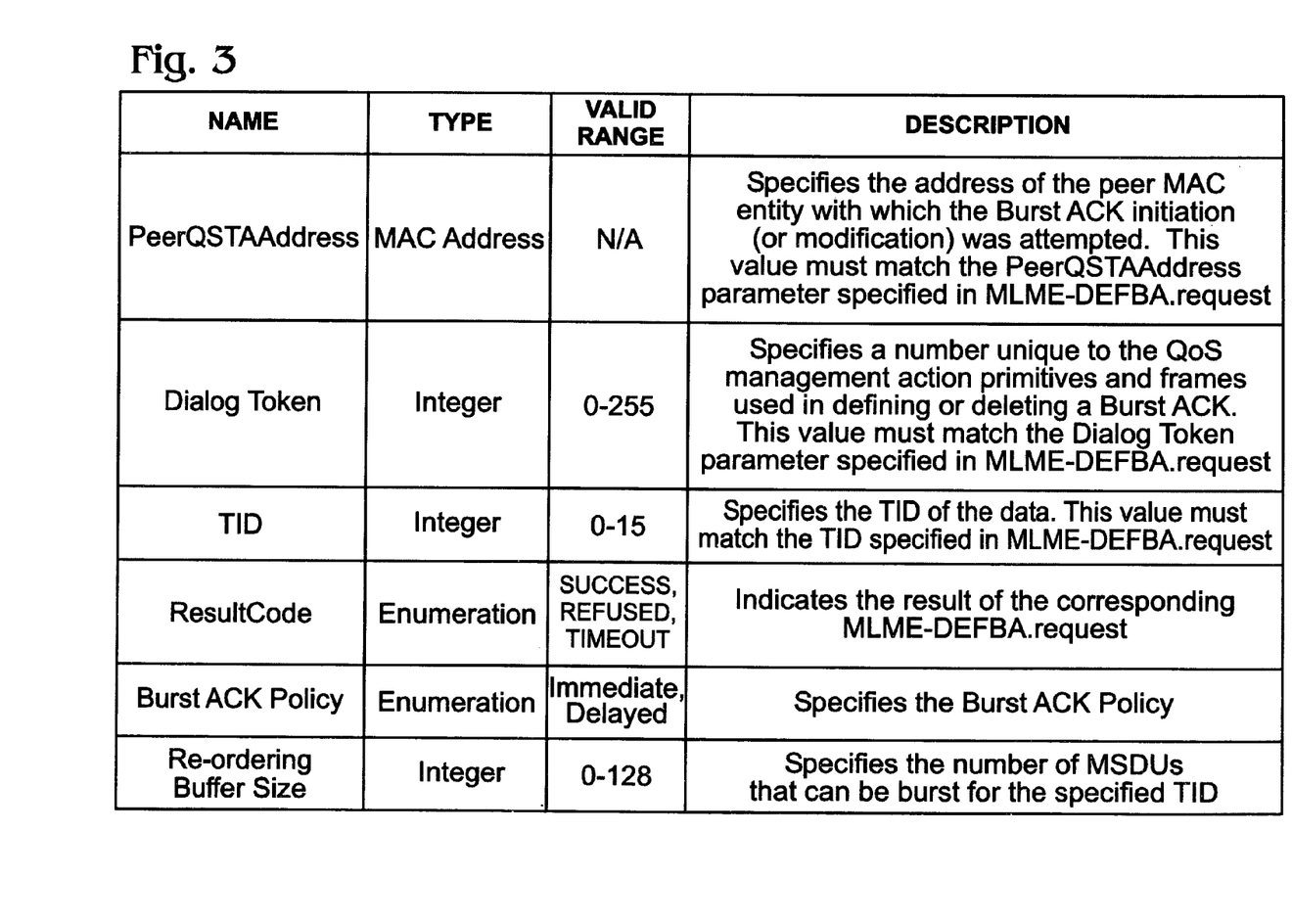
FIG. 3 is a table listing MLME-DEFBA.confirm fields.

FIG. 3 is a table listing MLME-DEFBA.confirm fields. The primitive reports the results of initiation (or modification) of the Burst ACK attempt with the specified peer MAC entity. The primitive parameters are as follows:

| MLME-DEFBA.confirm | ( PeerQSTAAddress, Dialog token, TID, ResultCode, Burst ACK Policy, Re-ordering Buffer Size ) |
|---|---|

This primitive is generated by the MLME as a result of an MLME-DEFBA.request to indicate the results of that request. Upon receipt, the SME is notified of the results of the Burst ACK initiation (or modification).

MLME-DEFBA.indication

Figure 4:
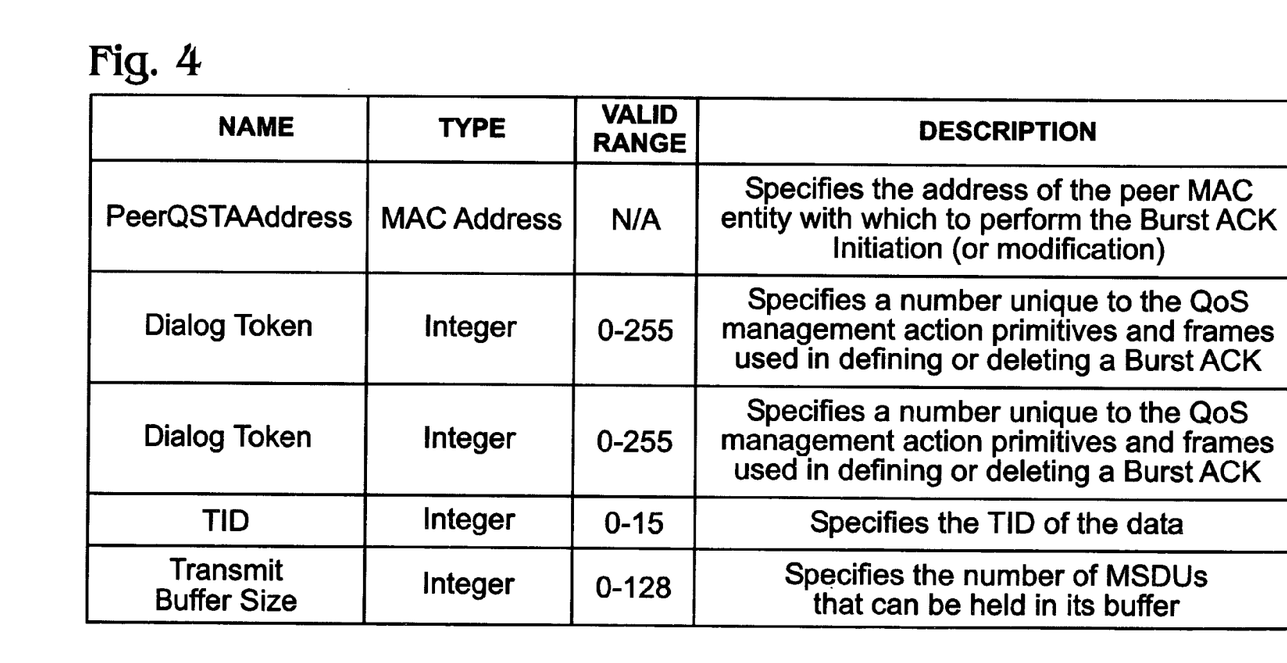
FIG. 4 is a table listing MLME-DEFBA.indication primitive fields.

FIG. 4 is a table listing MLME-DEFBA.indication primitive fields. This primitive reports the indication of Burst ACK initiation (or modification) of Burst ACK with a peer MAC entity. The primitive parameters are as follows:

| MLME-DEFBA.request | ( |
| --- | --- |
| | PeerQSTAAddress, |
| | Dialog token, |
| | TID, |
| | Transmit Buffer Size |
| | ) |

This primitive is generated by the MLME as a result of receipt of a Burst ACK initiation (or modification) by the specified peer MAC entity in the form of a Define Burst ACK request QoS Action frame. Upon receipt, the SME is notified of the initiation (or modification) of the Burst ACK by the specified peer MAC entity.

MLME-DEFBA.response

Figure 5:
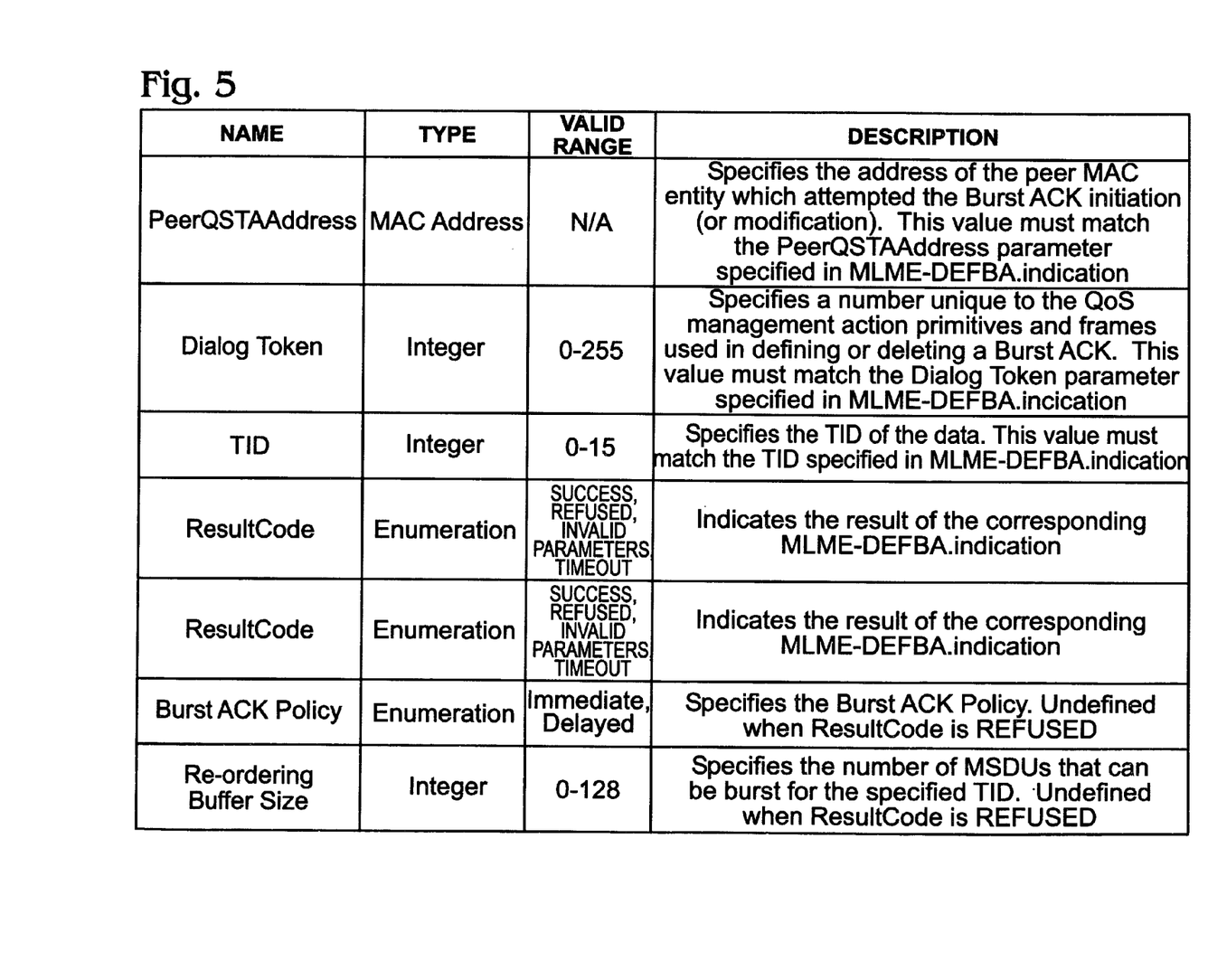
FIG. 5 is a table listing fields of the MLME-DEFBA.response primitive.

FIG. 5 is a table listing fields of the MLME-DEFBA.response primitive. The primitive responds to the Burst ACK initiation (or modification) by a specified peer MAC entity. The primitive parameters are as follows:

| MLME-DEFBA.response | ( |
| --- | --- |
| | PeerQSTAAddress, |
| | Dialog token, |
| | TID, |
| | ResultCode, |
| | Burst ACK Policy, |
| | Re-ordering Buffer Size |
| | ) |

This primitive is generated by the MLME as a result of an MLME-DEFBA.indication to initiate Burst ACK with the specified peer MAC entity. Upon receipt, the primitive causes the MAC entity to send a Define Burst ACK response QoS Action frame to the peer MAC entity.

MLME-DELBA.request

Figure 6:
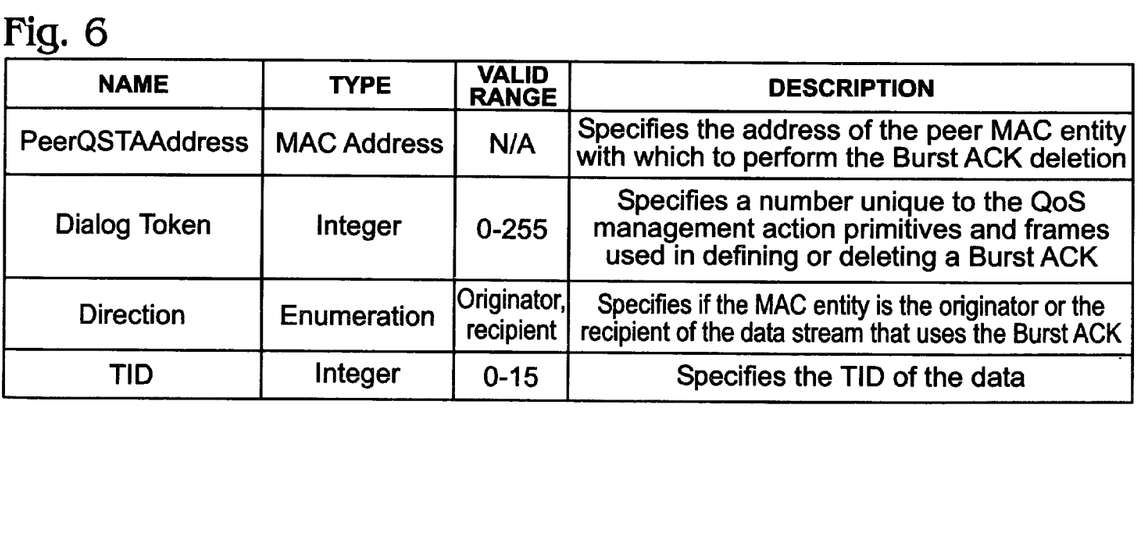
FIG. 6 is a table listing fields of the MLME-DELBA.request primitive.

FIG. 6 is a table listing fields of the MLME-DELBA.request primitive. This primitive requests the deletion of Burst ACK with a peer MAC entity. The primitive parameters are as follows:

| MLME-DEFBA.request | ( |
| --- | --- |
| | PeerQSTAAddress, |
| | Dialog token, |
| | Direction, |
| | TID |
| | ) |

This primitive is generated by the SME at a QSTA to request deletion of Burst ACK with the specified peer MAC entity. Upon receipt, the QSTA sends the Delete Burst ACK request QoS Action frame to the specified peer MAC entity.

MLME-DELBA.confirm

Figure 7:
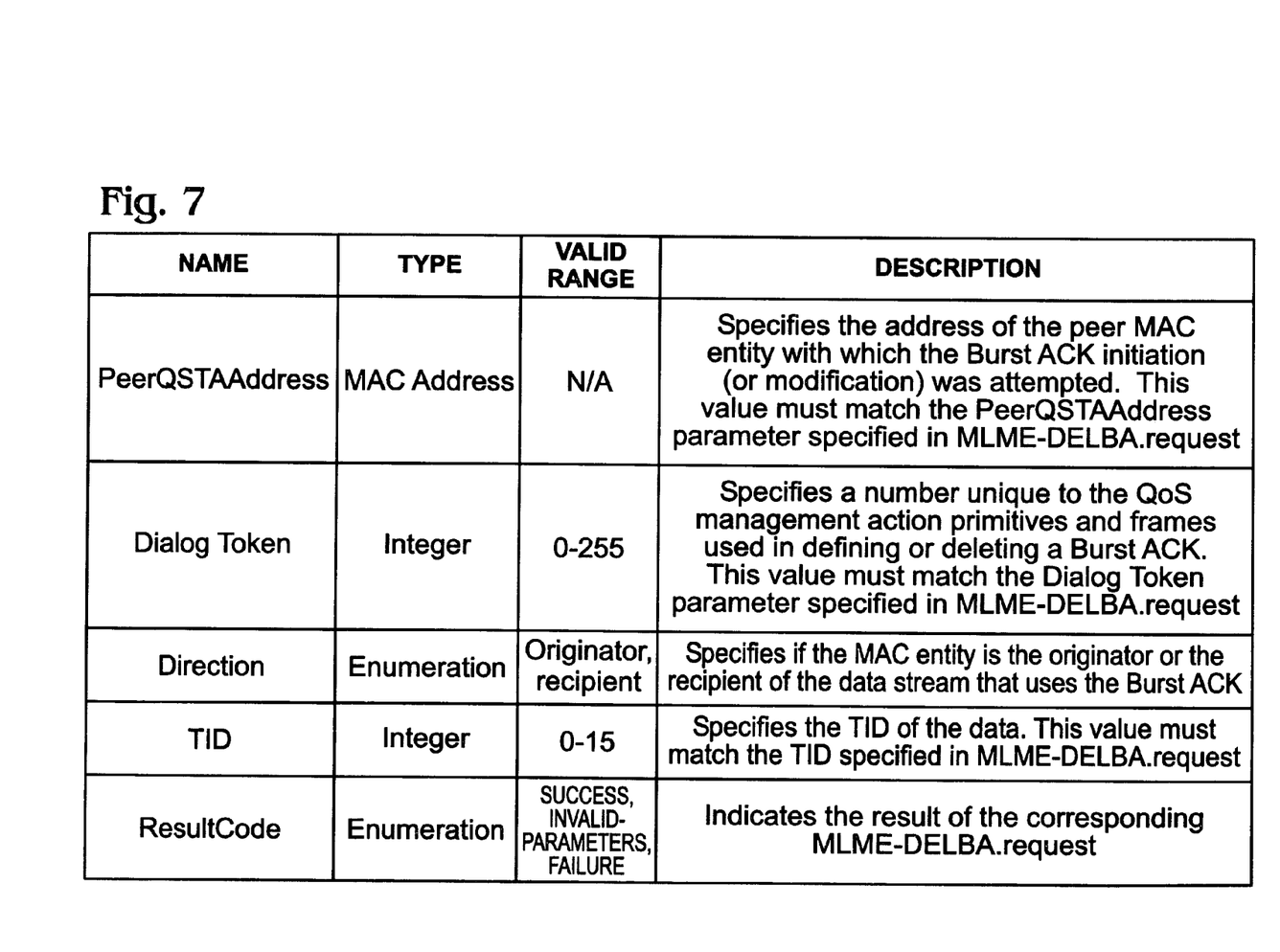
FIG. 7 is a table listing fields of the MLME-DELBA.confirm primitive.

FIG. 7 is a table listing fields of the MLME-DELBA.confirm primitive. The primitive reports the results of the Burst ACK deletion attempt with a specified peer MAC entity. The primitive parameters are as follows:

| MLME-DELBA.confirm | ( |
| --- | --- |
| | PeerQSTAAddress, |
| | Dialog token, |
| | Direction, |
| | TID, |
| | ResultCode, |
| | ) |

This primitive is generated by the MLME as a result of an MLME-DELBA.request to indicate the results of that request. Upon receipt, the SME is notified of the results of the Burst ACK deletion.

MLME-DELBA.indication

Figure 8:
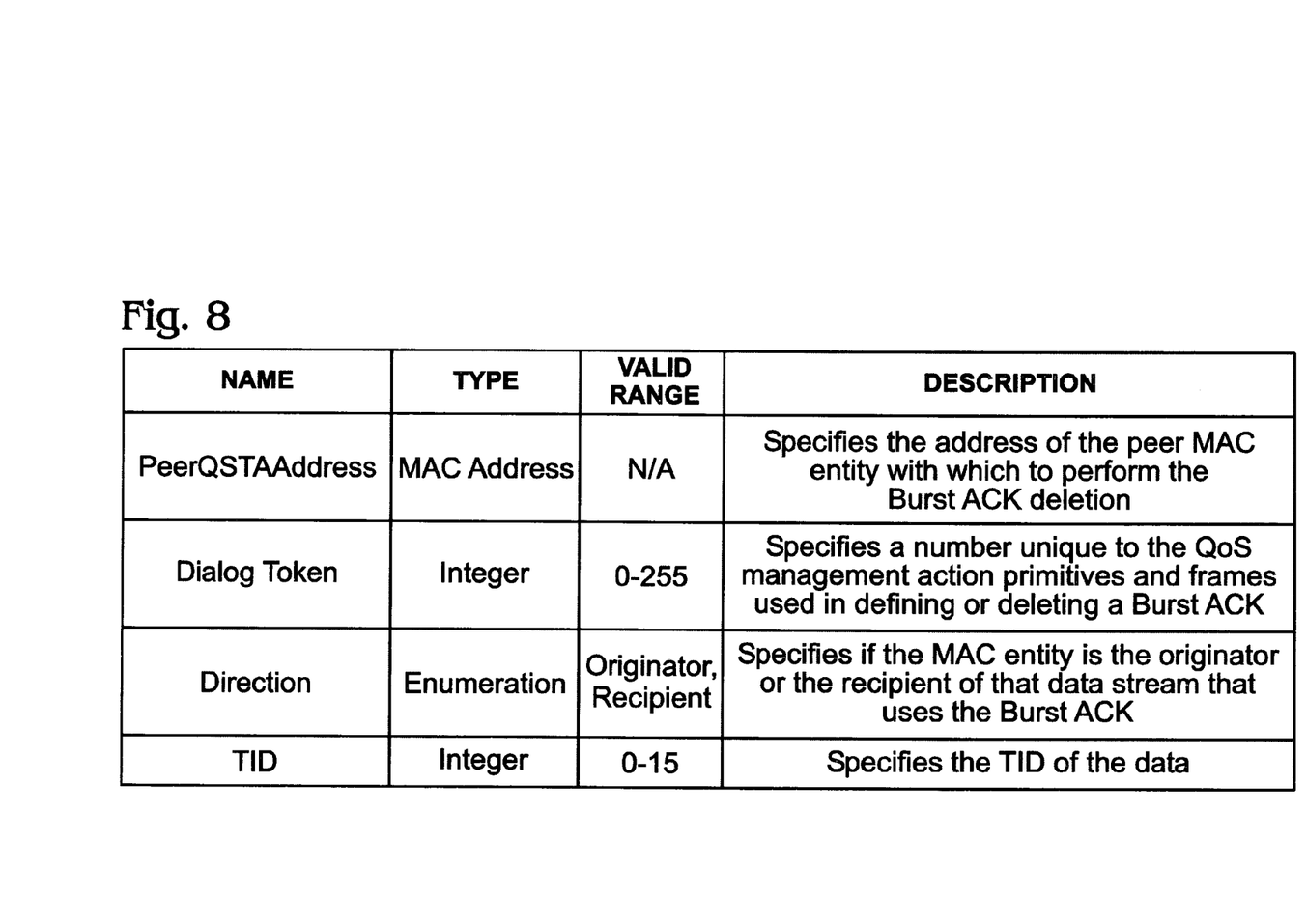
FIG. 8 is a table listing fields of the MLME-DELBA.indication primitive.

FIG. 8 is a table listing fields of the MLME-DELBA.indication primitive. This primitive reports the indication of Burst ACK deletion of Burst ACK with a peer MAC entity. The primitive parameters are as follows:

| MLME-DELBA.indication | ( |
| --- | --- |
| | PeerQSTAAddress, |
| | Dialog token, |
| | Direction, |
| | TID |
| | ) |

This primitive is generated by the MLME as a result of receipt of a Burst ACK deletion by the specified peer MAC entity in the form of a Delete Burst ACK request QoS Action frame. Upon receipt, the SME is notified of the deletion of the Burst ACK by the specified peer MAC entity.

Use of the Interface

The following is a description of how the interface is used to set up, modify and delete Burst ACK.

Set Up and Modification of the Burst ACK Parameters

Figure 9:
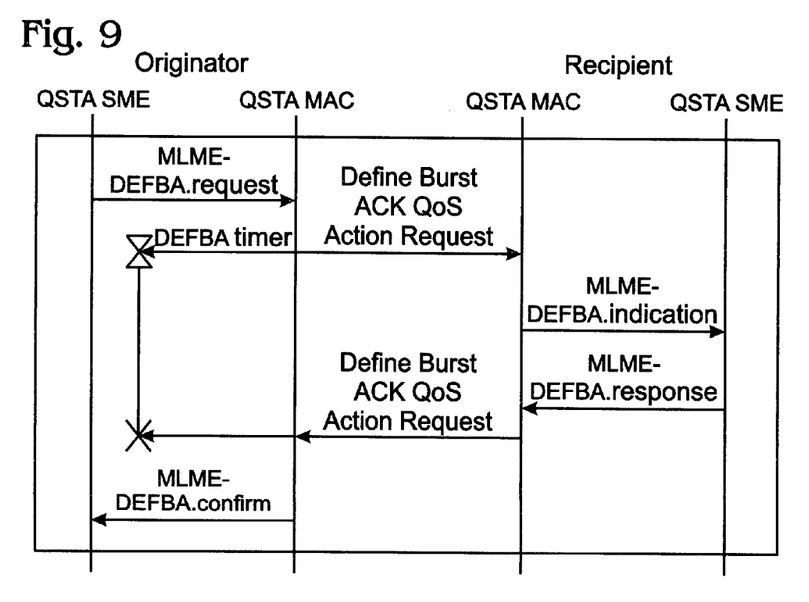
FIG. 9 illustrates the procedures for setting up and modifying the Burst ACK parameters.

FIG. 9 illustrates the procedures for setting up and modifying the Burst ACK parameters.

Procedure at the Originator

Upon receipt of MLME-DEFBA.request, an originating QSTA sets up the Burst ACK via the following procedure:

a) Check if the intended recipient QSTA is capable of participating in Burst ACK mechanism by discovering and examining its "Burst ACK" capability bit. If the recipient is capable of participating, the originator sends a Define Burst ACK request QoS Action frame indicating the TID.

b) If a Define Burst ACK response QoS Action frame is received with the matching Dialog Token and the TID, and with a Result Code set to a value of "Action completed successfully", the QSTA has established Burst ACK mechanism with the receiving QSTA and the MLME issues an MLME-DEFBA.confirm indicating the successful completion of the operation.

c) If a Define Burst ACK response QoS Action frame is received with the matching Dialog Token and the TID, and with a Result Code set to a value other than "Action completed successfully", the QSTA has not established Burst ACK mechanism with the receiving QSTA and the MLME issues an MLME-DEFBA.confirm indicating the failure of the operation.

Procedure at the Recipient

A receiver operates as follows in order to support Burst ACK initialization and modification.

a) Whenever a Define Burst ACK QoS Action frame is received from another QSTA, the MLME issues an MLME-DEFBA.indication.
b) Upon receipt of the MLME-DEFBA.response, the QSTA responds with a Define Burst ACK response QoS Action response frame with a Result code as defined in 7.4.3.2 of the IEEE 802.11e/D3.2 Standard.
   1) If the Result code is "Action completed successfully" the Burst ACK is considered to be established with the originator. Contained in the frame are the type of Burst ACK and the number of buffers that have been allocated for the support of this burst.
   2) If the Result code is "REFUSED" the Burst ACK is not considered to have been established.

Tear Down of the Burst ACK Mechanism

Figure 10:
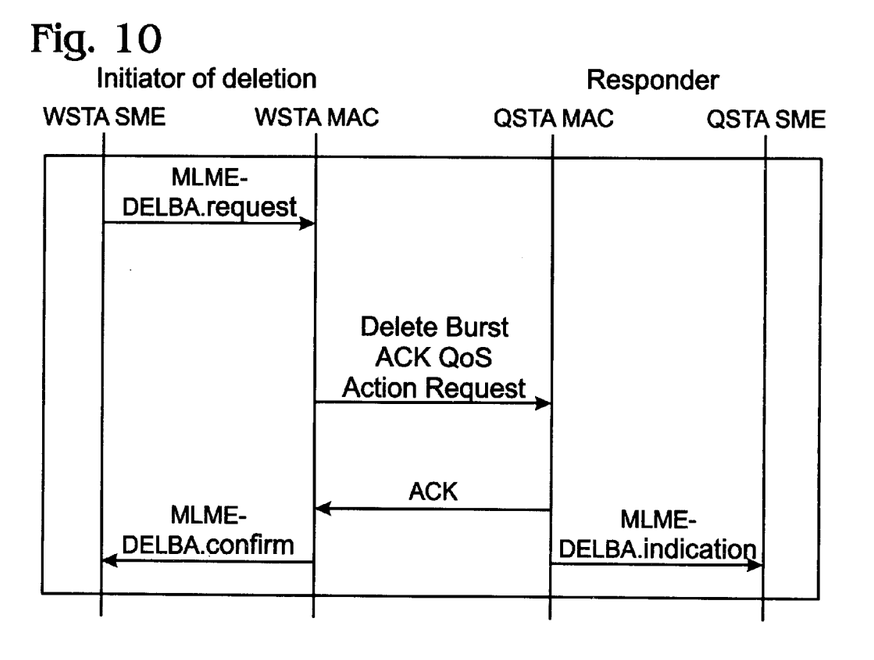
FIG. 10 is a diagram illustrating the Bust ACK mechanism tear down procedure.

FIG. 10 is a diagram illustrating the Bust ACK mechanism tear down procedure. When the originator has no data to send it signals the end of its use of the Burst ACK mechanism by sending the Delete Burst ACK QoS Action Management frame to its recipient. There is no Management frame response from the recipient. The data transfer for TS may also be terminated through the Delete TS QoS Action Management frame, in which case, the recipient of the Delete TS assumes that any Burst ACK that has been set up between the originator and the recipient is also terminated without requiring an explicit Delete Burst ACK QoS Action frame.

Procedure at the Initiator of the Burst ACK Teardown

Upon receipt of MLME-DELBA.request, the QSTA tears down the Burst ACK via the following procedure:
a) The QSTA transmits a Delete Burst ACK request QoS Action frame.
b) Upon the receipt of an acknowledgement to the Delete Burst ACK request QoS Action frame, the MLME issues a MLME-DELBA.confirm.
c) If the QSTA is the recipient of the traffic, it ignores all the frames with ACK Policy in QoS control set to Burst ACK and the BurstAckReq frame received subsequently.

Procedure at the Recipient of the Delete Burst ACK Request QoS Action Frame

A QSTA performs the following action when a Delete Burst ACK request QoS Action frame is received:
a) The MLME issues a MLME-DELBA.indication.
b) If the QSTA is the originator of traffic, it sends either the frames with the ACK policy in QoS control set to Burst ACK, or a BurstAckReq frame.

Error Recovery upon a Peer Failure

An originator or a recipient assumes that there is a peer failure, if its peer fails to respond within a defined timeout. The duration of this timeout is dot11PeerLivenessTimeout, a management Information base (MIB) parameter that is known to the station. An originator failure is detected if there is no Data or BurstAckReq MPDU received from it using the TID for the duration of the timeout. A recipient failure is detected if there is no BurstAck MPDU received from it using the TID for the duration of the timeout.

Figure 11:
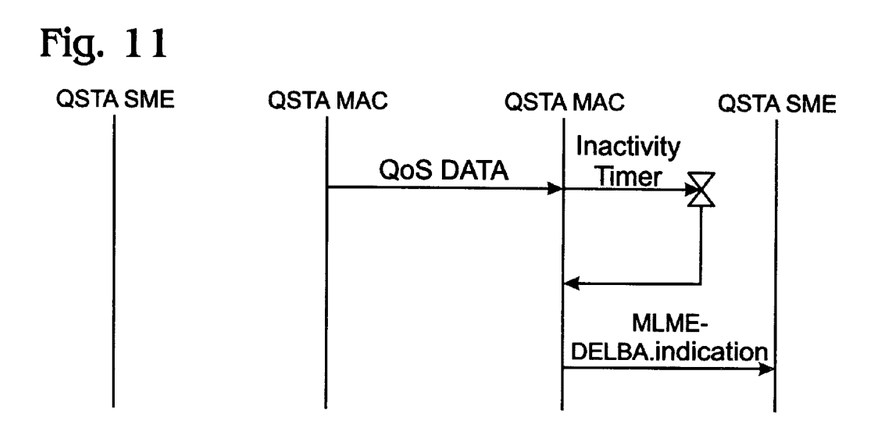
FIG. 11 is a diagram illustrating the error recovery mechanism.

FIG. 11 is a diagram illustrating the error recovery mechanism. When a timeout is detected, the QSTA acts as though a Delete Burst ACK had been received and issues a MLME-DELBA.indication. If the timeout is detected at the recipient and the originator subsequently attempts continue using the BurstAck mechanism with this TID, then the recipient ignores any Data MPDUs sent using this TID and sends a Delete Burst ACK request frame. The originator may attempt to set up the use of Burst ACK or may send the MPDUs using an alternative acknowledgement mechanism.

Figure 12:
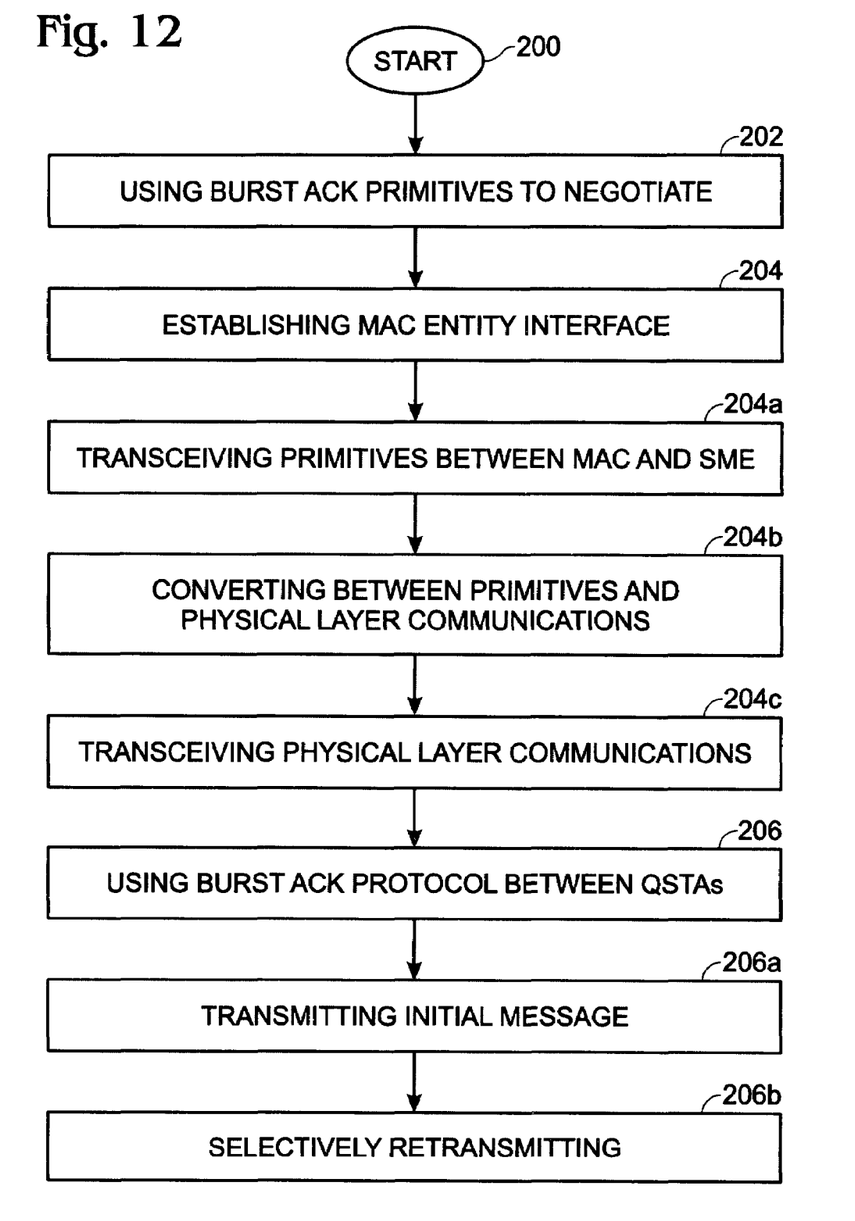
FIG. 12 is a flowchart illustrating the present method for defining a Burst Acknowledgement (ACK) interface invention in an IEEE 802.11 network.

FIG. 12 is a flowchart illustrating the present method for defining a Burst Acknowledgement (ACK) interface invention in an IEEE 802.11 network. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence.

The method starts at Step 200. Step 202 uses Burst ACK primitives to negotiate between peer station management entities (SMEs). Step 204 establishes an interface between peer MAC entities associated with the SMEs. Step 206, in response to negotiating with the Burst ACK primitives, uses a Burst ACK protocol to communicate information between peer Quality of Service (QoS) stations (QSTAs) associated with the SMEs. In some aspects of the method, using a Burst ACK protocol to communicate information between peer Quality of Service (QoS) stations (QSTAs) in Step 206 includes using Burst ACK protocol to communicate between the peer MAC entities.

In some aspects, establishing an interface between peer MAC entities in Step 204 includes substeps. In Step 204*a* each MAC entity transceives Burst ACK primitives with an associated SME. In Step 204*b* each MAC entity converts between Burst ACK primitives and physical layer communication MAC frames. In Step 204*c* each MAC entity transceives communication physical layer MAC frames with a peer MAC entity, via the physical layer communication MAC frames.

In some aspects of the method, transceiving Burst ACK primitives with an associated SME in Step 204*a* includes actions such as initiating Burst ACK parameters, modifying established Burst ACK parameters, or tearing down established Burst ACK parameters.

In other aspects, using a Burst ACK protocol to communicate information between peer QSTAs in Step 206 includes substeps. Step 206*a* transmits an initial message. Step 206*b* selectively retransmits the initial message in response to failing to receive an initial message acknowledgement.

In some aspects of the method, transceiving Burst ACK primitives with an associated SME in Step 204*a* includes a first SME issuing a MLME-DEXBA.request primitive to an associated first MAC entity. Then, Step 204*b* includes the first MAC entity converting the MLME-DEXBA.request primitive into a Burst ACK request frame and Step 204*c* includes a first QSTA associated with the first MAC transmitting the Burst ACK request frame to a second QSTA.

Likewise, converting between Burst ACK primitives and MAC frames in Step 204*b* includes a second MAC entity associated with the second QSTA converting the Burst ACK request frame into a MLME-DEXBA.indication primitive and Step 204*a* includes the second MAC entity sending the MLME-DEXBA.indication primitive to an associated second SME.

In other aspects, transceiving Burst ACK primitives with an associated SME in Step 204*a* includes the second SME issuing a MLME-DEXBA.response primitive to the second MAC entity. Then, Step 204*b* includes the second MAC entity converting the MLME-DEXBA.response primitive into a Burst ACK response frame, and Step 204*c* includes the second QSTA transmitting the Burst ACK response frame to the first QSTA.

Finally, Step 204*b* may include the first MAC entity converting the Burst ACK response frame into a MLME- DEXBA.confirm primitive, and Step 204a may include the first MAC entity sending the MLME-DEFBA.confirm primitive to the first SME.

In some aspects, issuing a MLME-DEXBA.request primitive to an associated first MAC entity in Step 204a includes issuing a MLME-DEFBA.request primitive with fields selected from the group including the second MAC entity address, a Dialog Token to define QoS management action primitives and frames used in defining and deleting a Burst ACK, a traffic identifier (TID), and a transmit buffer size definition.

In other aspects, Step 204a includes sending a MLME-DEFBA.indication primitive with fields selected from the group including the first MAC entity address, a Dialog Token to define QoS management action primitives and frames used in defining or deleting a Burst ACK, a TID, and a transmit buffer size definition.

In some aspects, the second SME issuing a MLME-DEXBA.response primitive to an associated second MAC entity in Step 204a includes issuing a MLME-DEFBA.response primitive with fields selected from the group including the first MAC entity address, a Dialog Token matching the Dialog Token received in the MLME-DEFBA.indication primitive, a TID matching the TID received in the MLME-DEFBA.indication primitive, and a ResultCode to indicate the response to the received MLME-DEFBA.indication primitive, a Burst ACK Policy to specify a policy selected from the group including immediate and delayed, and a Re-ordering Buffer Size to specify the TID burst size.

In some aspects, the first MAC entity sending a MLME-DEXBA.confirm primitive to the first SME in Step 204a includes sending a MLME-DEFBA.confirm primitive with fields selected from the group including the second MAC entity address, a Dialog Token matching the Dialog Token issued in the MLME-DEFBA.request primitive, a TID matching the TID received in the MLME-DEFBA.request primitive, a ResultCode to indicate the response to the received MLME-DEFBA.request primitive, a Burst ACK Policy to specify a policy selected from the group including immediate and delayed, and a Re-ordering Buffer Size to define the TID burst size.

In other aspects, the first SME issuing a MLME-DEXBA.request primitive to an associated first MAC entity in Step 204a includes issuing a MLME-DELBA.request primitive with fields selected from the group including the second MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID to specify the TID of the data.

In some aspects, the second MAC entity sending a MLME-DEXBA.indication primitive to the second SME in Step 204a includes sending a MLME-DELBA.indication primitive with fields selected from the group including the first MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID specifying the TID of the data.

In one aspect of the method, the first MAC entity sending the MLME-DEXBA.confirm primitive to an associated first SME in Step 204a includes sending a MLME-DELBA.confirm primitive with fields selected from the group including the second MAC entity address, a Dialog Token matching the Dialog Token of the MLME-DELBA.request, a Direction selecting the MAC entity named in the MAC address field from a group including the originator and the recipient of the data stream that uses the Burst ACK, a TID matching the value specified in the MLME-DELBA.request, and a ResultCode indicating the result of the corresponding MLME-DELBA.request.

A system and method have been provided for establishing, modifying, and tearing down a Burst ACK protocol in a IEEE 802.11 network. A few examples have been given to illustrate the invention. However, the invention is not limited to merely these examples. Neither is the invention dependent upon the particular names of the primitives or the particular organization of primitive fields, as presented. While the invention describes an abstract interface, a corresponding device could be enabled as a stand-alone MAC chip, which would have an interface to provide a sequence of messages. Other variations and embodiments of the invention will occur to those skilled in the art.

We claim:

1. In an IEEE 802.11 network, a method for defining a Burst Acknowledgement (ACK) interface, the method comprising:
   using Burst ACK primitives to negotiate between peer station management entities (SMEs); and,
   in response to negotiating with the Burst ACK primitives, using a Burst ACK protocol to communicate information between peer Quality of Service (QoS) stations (QSTAs) associated with the SMEs wherein using a Burst ACK protocol to communicate information between peer QSTAs includes:
   Transmitting an initial message; and,
   Selectively retransmitting the initial message in response to failing to receive an initial message acknowledgement.

2. The method of claim 1 further comprising:
   establishing an interface between peer MAC entities associated with the SMEs; and,
   wherein using a Burst ACK protocol to communicate information between peer QSTAs includes using Burst ACK protocol to communicate between the peer MAC entities.

3. The method of claim 2 wherein establishing an interface between peer MAC entities includes each MAC entity:
   transceiving Burst ACK primitives with an associated SME;
   converting between Burst ACK primitives and physical layer communication MAC frames; and,
   transceiving communication physical layer MAC frames with a peer MAC entity, via the physical layer communication MAC frames.

4. The method of claim 3 wherein transceiving Burst ACK primitives with an associated SME includes a first SME issuing a MLME-DEXBA.request primitive to an associated first MAC entity;
   wherein converting between Burst ACK primitives and MAC frames includes the first MAC entity converting the MLME-DEXBA.request primitive into a Burst ACK request frame; and,
   wherein transceiving communication frames with a peer MAC entity includes a first QSTA associated with the first MAC transmitting the Burst ACK request frame to a second QSTA.

5. The method of claim 3 wherein transceiving Burst ACK primitives with an associated SME includes actions selected from the group including initiating Burst ACK parameters, modifying established Burst ACK parameters, and tearing down established Burst ACK parameters.

6. The method of claim 4 wherein converting between Burst ACK primitives and MAC frames includes a second MAC entity associated with the second QSTA converting the Burst ACK request frame into a MLME-DEXBA.indication primitive; and,
wherein transceiving Burst ACK primitives with an associated SME includes the second MAC entity sending the MLME-DEXBA.indication primitive to an associated second SME.

7. The method of claim 6 wherein transceiving Burst ACK primitives with an associated SME includes the second SME issuing a MLME-DEXBA.response primitive to the second MAC entity;
wherein converting between Burst ACK primitives and MAC frames includes the second MAC entity converting the MLME-DEXBA.response primitive into a Burst ACK response frame; and,
wherein transceiving communication frames with a peer MAC entity includes the second QSTA transmitting the Burst ACK response frame to the first QSTA.

8. The method of claim 7 wherein converting between Burst ACK primitives and MAC frames includes the first MAC entity converting the Burst ACK response frame into a MLME-DEXBA.confirm primitive; and,
wherein transceiving Burst ACK primitives with an associated SME includes the first MAC entity sending the MLME-DEFBA.confirm primitive to the first SME.

9. The method of claim 8 wherein the first SME issuing a MLME-DEXBA.request primitive to an associated first MAC entity includes issuing a MLME-DEFBA.request primitive with fields selected from the group including the second MAC entity address, a Dialog Token to define QoS management action primitives and frames used in defining and deleting a Burst ACK, a traffic identifier (TID), and a transmit buffer size definition.

10. The method of claim 8 wherein the second MAC entity sending the MLME-DEXBA.indication primitive to an associated second SME includes sending a MLME-DEFBA.indication primitive with fields selected from the group including the first MAC entity address, a Dialog Token to define QoS management action primitives and frames used in defining or deleting a Burst ACK, a TID, and a transmit buffer size definition.

11. The method of claim 8 wherein the second SME issuing a MLME-DEXBA.response primitive to an associated second MAC entity includes issuing a MLME-DEFBA.response primitive with fields selected from the group including the first MAC entity address, a Dialog Token matching the Dialog Token received in the MLME-DEFBA.indication primitive, a TID matching the TID received in the MLME-DEFBA.indication primitive, and a ResultCode to indicate the response to the received MLME-DEFBA.indication primitive, a Burst ACK Policy to specify a policy selected from the group including immediate and delayed, and a Re-ordering Buffer Size to specify the TID burst size.

12. The method of claim 8 wherein the first MAC entity sending a MLME-DEXBA.confirm primitive to the first SME includes sending a MLME-DEFBA.confirm primitive with fields selected from the group including the second MAC entity address, a Dialog Token matching the Dialog Token issued in the MLME-DEFBA.request primitive, a TID matching the TID received in the MLME-DEFBA.request primitive, a ResultCode to indicate the response to the received MLME-DEFBA.request primitive, a Burst ACK Policy to specify a policy selected from the group including immediate and delayed, and a Re-ordering Buffer Size to define the TID burst size.

13. The method of claim 12 wherein the first SME issuing a MLME-DEXBA.request primitive to an associated first MAC entity includes issuing a MLME-DELBA.request primitive with fields selected from the group including the second MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID to specify the TID of the data.

14. The method of claim 13 wherein the second MAC entity sending a MLME-DEXBA.indication primitive to the second SME includes sending a MLME-DELBA.indication primitive with fields selected from the group including the first MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID specifying the TID of the data.

15. The method of claim 14 wherein the first MAC entity sending the MLME-DEXBA.confirm primitive to an associated first SME includes sending a MLME-DELBA.confirm primitive with fields selected from the group including the second MAC entity address, a Dialog Token matching the Dialog Token of the MLME-DELBA.request, a Direction selecting the MAC entity named in the MAC address field from a group including the originator and the recipient of the data stream that uses the Burst ACK, a TID matching the value specified in the MLME-DELBA.request, and a ResultCode indicating the result of the corresponding MLME-DELBA.request.

16. In an IEEE 802.11 network, a Burst Acknowledgement (ACK) interface system, the system comprising:
a pair of peer Quality of Service (QoS) stations (QSTAs), each QSTA including:
a station management entity (SME) having a MAC interface for transceiving Burst ACK primitives; and,
a MAC entity having an SME interface to transceive primitives, a processor to convert between primitives and MAC frames, and a physical layer interface to transceive primitive-converted MAC frames;
a physical layer (PHY) entity having a MAC interface to transceive MAC frames and a physical layer interface connected to a peer QSTA PHY entity to transceive physical layer communications; and,
wherein peer QSTA MAC entities use a Burst ACK protocol to communicate information, in response to peer QSTA SMEs negotiating with the Burst ACK primitives.

17. The system of claim 16 wherein a first QSTA MAC entity transmits an initial message, via a first QSTA PHY entity, to a second QSTA MAC entity; and,
wherein the first QSTA MAC entity selectively retransmits the initial message to the second QSTA MAC entity in response to failing to receive an initial message acknowledgement from the second QSTA MAC entity.

18. The system of claim 17 wherein a first QSTA SME issues a MLME-DEXBA.request primitive to the first QSTA MAC entity;

wherein the first QSTA MAC entity converts the MLME-DEXBA.request primitive into a Burst ACK request frame; and, wherein the first QSTA PHY entity transmits the Burst ACK request frame to a second QSTA PHY entity.

19. The system of claim 18 wherein the second QSTA MAC entity converts the Burst ACK request frame received by the second QSTA PHY entity into a MLME-DEXBA.indication primitive and sends the MLME-DEXBA.indication primitive to a second QSTA SME.

20. The system of claim 19 wherein the second QSTA SME issues a MLME-DEXBA.response primitive to the second QSTA MAC entity;

wherein the second QSTA MAC entity converts the MLME-DEXBA.response primitive into a Burst ACK response frame; and, wherein the second QSTA PHY entity transmits the Burst ACK response frame to the first QSTA PHY entity.

21. The system of claim 20 wherein the first QSTA MAC entity converts the Burst ACK response frame into a MLME-DEXBA.confirm primitive and sends the MLME-DEXBA.confirm primitive to the first QSTA SME.

22. The system of claim 21 wherein the first QSTA SME issues a MLME-DEFBA.request primitive with fields selected from the group including the second MAC entity address, a Dialog Token to define QoS management action primitives and frames used in defining and deleting a Burst ACK, a traffic identifier (TID), and a transmit buffer size definition.

23. The system of claim 21 wherein the second QSTA MAC entity sends the MLME-DEFBA.indication primitive to the second QSTA SME with fields selected from the group including the first MAC entity address, a Dialog Token to define QoS management action primitives and frames used in defining or deleting a Burst ACK, a TID, and a transmit buffer size definition.

24. The system of claim 21 wherein the second QSTA SME issues a MLME-DEFBA.response primitive with fields selected from the group including the first MAC entity address, a Dialog Token matching the Dialog Token received in the MLME-DEFBA.indication primitive, a TID matching the TID received in the MLME-DEFBA.indication primitive, a ResultCode to indicate the response to the received MLME-DEFBA.indication primitive, a Burst ACK Policy to specify a policy selected from the group including immediate and delayed, and a Re-ordering Buffer Size to specify the TID burst size.

25. The system of claim 21 wherein the first QSTA MAC entity sends a MLME-DEFBA.confirm primitive to the first QSTA SME with fields selected from the group including the second MAC entity address, a Dialog Token matching the Dialog Token issued in the MLME-DEFBA.request primitive, a TID matching the TID received in the MLME-DEFBA.request primitive, a ResultCode to indicate the response to the received MLME-DEFBA.request primitive, a Burst ACK Policy to specify a policy selected from the group including immediate and delayed, and a Re-ordering Buffer Size to define the TID burst size.

26. The system of claim 21 wherein the first QSTA SME issues a MLME-DELBA.request primitive with fields selected from the group including the second MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID to specify the TID of the data.

27. The system of claim 21 wherein the second QSTA MAC entity sends a MLME-DELBA.indication primitive with fields selected from the group including the second MAC entity address, a Dialog Token to define QoS management action primitives and frames used in defining and deleting a Burst ACK, a Direction selecting the MAC entity named in the MAC address field from a group including the originator and the recipient of the data stream that uses the Burst ACK, and a TID specifying the TID of the data.

28. The system of claim 21 wherein the first QSTA MAC entity sends a MLME-DELBA.confirm primitive with fields selected from the group including the second MAC entity address, a Dialog Token matching the Dialog Token of the MLME-DELBA.request, a Direction selecting the MAC entity named in the MAC address field from a group including the originator and the recipient of the data stream that uses the Burst ACK, a TID matching the value specified in the MLME-DELBA.request, and a ResultCode indicating the result of the corresponding MLME-DELBA.request.

29. The system of claim 21 wherein the first QSTA SME transceives Burst ACK primitives to perform an action selected from the group including initiating Burst ACK parameters, modifying established Burst ACK parameters, and tearing down established Burst ACK parameters.

* * * * *